United States Patent [19]

Fraser

[11] Patent Number: 5,755,030
[45] Date of Patent: May 26, 1998

US005755030A

[54] TURBINE BLADE REPAIR

[75] Inventor: Michael James Fraser, Cheltenham, United Kingdom

[73] Assignee: Turbine Blading Limited, Shipton on Stour, England

[21] Appl. No.: 652,453
[22] PCT Filed: Dec. 1, 1994
[86] PCT No.: PCT/GB94/02633
§ 371 Date: Jul. 29, 1996
§ 102(e) Date: Jul. 29, 1996
[87] PCT Pub. No.: WO95/15240
PCT Pub. Date: Jun. 8, 1995

[30] Foreign Application Priority Data

Dec. 2, 1993 [GB] United Kingdom ............ 9324766

[51] Int. Cl.$^6$ ................................. B23P 15/00
[52] U.S. Cl. ........................ 29/889.1; 29/402.07
[58] Field of Search ................... 29/889.1, 402.07, 29/402.01, 402.08, 402.09, 402.13, 402.21; 228/119

[56] References Cited

FOREIGN PATENT DOCUMENTS

| 0263713 | 4/1988 | European Pat. Off. . |
| 2279173 | 11/1990 | Japan . |
| 2091 139 | 7/1982 | United Kingdom . |
| 2114 921 | 9/1983 | United Kingdom . |

*Primary Examiner*—Irene Cuda
*Attorney, Agent, or Firm*—Armstrong, Westerman, Hattori, McLeland & Naughton

[57] ABSTRACT

A method of repairing a turbine blade in which damaged material around a lacing wire hole is removed by machining or chemical etching. New metal is then added by welding such that the lacing wire hole is much smaller or completely eliminated and prior to reforming the lacing wire hole, flats may be formed either by the addition or removal of metal in the region of the lacing wire hole so that a lacing wire hole forming drill or machine bit can enter the turbine blade at a surface substantially normal to its direction of travel, thereby minimizing any tendency of the lacing wire hole forming drill or machine bit to snatch or for the blade to vibrate.

10 Claims, 3 Drawing Sheets

TURBINE BLADE REPAIR

DESCRIPTION OF INVENTION

The present invention relates to a method of repairing turbine blades and is primarily concerned with repair of rotor blades having apertures therein through which apertures pass blade interconnecting members such as lacing wires, cover bands and seals or the like.

For the sake of convenience, all such discontinuities will hereinafter be referred to as lacing wire holes.

After prolonged use of a turbine, it is not uncommon, particularly with some designs, for damage to occur around lacing wire holes. In view of the inclement environment in which turbines have to operate the metal of a turbine blade surrounding the lacing wire hole may be adversely affected during use. The metal surrounding the hole cane be damaged due to relative movement between the lacing wire and the blade. Such relative movement can cause hardening to the metal of the turbine blade causing brittleness which can encourage the formation of cracks and, if no remedial action is taken, any cracks formed may extend further and further away from the lacing wire hole into the blade and eventually render the blade in an unsafe condition.

In many cases the condition of the metal surrounding the lacing wire hole may not be immediately apparent. It is envisaged that when a turbine is taken out of commission for a plant maintenance programme, the blades will be inspected and if any blades in the array show any sign of damage it may be that all blades will require attention, albeit the damage may not be visible.

The damage may occur for a variety of reasons. There is normally a clearance between the lacing wire and the lacing wire hole allowing the lacing wire to float in a dampening mode and the gap that exists can give rise to the problems mentioned above. Furthermore, if the lacing wire hole is formed with slightly incorrect dimensions this can lead to an increased gap between the lacing wire and the blade, the gap can trap contaminants and furthermore incorrect fitting between the lacing wire and the blade can lead to movement between the two parts causing a hardening of the metal in that region. The hardening and trapping of contaminants leading to the phenomenon known as stress corrosion cracking.

Applicants have been involved in many processes for the repair of turbine blades. British Patent No. 2,091,139B discloses a method of repair of turbine blades in which an outer leading edge part which has been cracked or eroded is removed and replaced by a new piece of hard material. Prior to the application of considerable heat to the blade that may occur during welding and prior to the application of any physical force to the blade, and subsequent heat treatment, any lacing wire hole within the vicinity of the repair such that it may be affected by the considerable heat or physical force is first filled with weld material. The blade is therefore homogeneous and does not have discontinuities which, can either during the application of considerable heat during either welding or subsequent heat treatment processes, lead to inbuilt stress in the blade. It has been customary in many repair processes carried out by the applicant to first fill the lacing wire hole with weld material and then subsequently reform the lacing wire hole by drilling, for example.

British Patent No. 2,114,921B deals with the same problem and rather than filling the lacing wire hole with weld material involves the filling of a lacing wire hole with a plug which is welded to the blade, the plug may stand proud of the blade or be formed with other formations to provide locating means for a drilling machine so that the lacing wire hole can be accurately reformed.

A still further process is disclosed in application publication No. 2,006,372; the filling of lacing wire holes by driving in a tight fitting plug which can additionally be provided with a heat sink and possible fluid cooling to minimise adverse affects around the lacing wire hole.

All the above mentioned processes have been concerned with filling the lacing wire hole to remove the discontinuity whilst some other repair is being carried out. None however addresses the specific problem of lacing wire holes themselves and possible damage thereto.

It is an object of the present invention to provide a method of repairing a turbine blade in the vicinity of a lacing wire hole.

According to the present invention, we provide a method of repairing a lacing wire hole in a turbine blade comprising the steps of removing material around the lacing wire hole, replacing the material with new metal by welding, carrying out a heat treatment process around the repaired area and reforming the lacing wire hole by a machining operation.

Preferably more metal is replaced than is removed thereby leaving the lacing wire bole before being reformed considerably smaller than is actually required.

In order to carry out a repair to lacing wire holes, the straightforward solution appeared to be merely to enlarge the hole which would remove the damaged metal and replace the lacing wire with one of larger diameter or by a tube, for example, as is commonly used.

Unfortunately, even though sophisticated machinery had been developed by the applicant, the re-drilling of lacing wire holes, particularly when the blade is in situ on a rotor, is extremely difficult and where it is required to removed only a very small amount of material, for example a hardened surface around a lacing wire hole, it has been found to be almost impossible to accurately re-form the hole to an enlarged size due to the minimal contact between the machine bit and the blade causing the machine bit to snatch or the blade to vibrate, in all events causing undesired relative movement between the machine bit and the blade.

The above mentioned difficulties have been considerably reduced by the unexpected step of actually replacing the damaged material with more material than is required thus considerably reducing the size of the lacing wire hole and ensuring that when re-forming takes place, whether the re-formed hole is to be the original size or possibly larger or in some cases smaller, there is more than enough material for engagement by the machine bit to eliminate or reduce to an acceptable level any tendency to snatch or for the blade to vibrate.

The additional material applied has a secondary advantage in that the discontinuity left after the welding has taken place and whilst the heat treatment process maybe carried out is very small and, possibly due to the fact that the heat input to the blade is much smaller than would be the case for the extensive welding necessary when a new leading edge outer end portion is welded to the blade, it has been found that in most cases it is not necessary to completely close the lacing wire hole by weld material, it is however essential to provide sufficient material for the machine bit to be able to make proper engagement to reform the hole without any malformation due to snatch or vibration.

The reforming of the lacing wire hole as mentioned above is a fairly difficult operation and accuracy is of great importance not only that the lacing wire hole is correctly positioned but that it is also accurately formed.

One of the main difficulties is "wandering" of the tool reforming the lacing wire hole since the nature of the turbine blade necessitates a drill bit to approach at an oblique angle to the blade. This can cause skidding or other movement of the machine bit since, at least initially and at the end of the drilling operation, the force applied to the machine bit is quite uneven.

Preferably, the above mentioned difficulty is overcome by machining a flat on one or both sides of a turbine blade in the region of the lacing wire hole so that a machine bit, for example a drill, approaches the surface to be drilled to reform the lacing wire hole in a direction normal to that surface.

Conveniently, the other side of the turbine blade may also be machined so that on exit of the turbine blade of the machine bit, once again the machine bit is not caused to "wander".

As an alternative to providing a flat on one or both sides of the blade, when a welding operation is applied to the lacing wire hole to replace any metal removed therefrom, excess metal may be built up on both sides so that once again the machine bit, for example a drill, can approach and enter the blade to reform the lacing wire hole, the surface of the blade in the region of the lacing wire hole now being normal to the angle of approach of the machine bit.

In a similar fashion the other side of the blade may also be built up so that during reforming of the lacing wire hole the machine bit is not subjected to uneven forces.

In order to remove the damaged material, it is envisaged that it will be removed either by hand tools or machine tools, for example by grinding, and it is also envisaged that the damaged material may be removed by a machining operation.

It will be appreciated however that, as explained above, where it is only required to remove a small amount of material it may be difficult to accurately remove damaged material by machining due to the machining bit and the blade. However, since there is to be a subsequent welding operation in which the material will be replaced, the accuracy with which damaged material is removed, albeit it is of course essential to remove all damaged material, it is not critical.

It is also envisaged that material may be removed by other means, for example etching with acid particularly where it is necessary to remove braze metal that may be present, where lacing wires or rods or tubes have been brazed to the blade.

Preferably the method of repair also includes the provision of hardness testing after the welding operation such that the heat treatment process can then be altered so as to properly stress relieve the area around the lacing wire hole without adversely affecting other parts of the blade.

It is also envisaged that the area may be X-rayed to check that all damaged material has been removed and that no undesired but possibly hidden cracks or other discontinuities exist.

Preferably, at least when the blade has to be repaired in situ, i.e. whilst still on the rotor and in close proximity to other blades, the lacing wire hole is reformed in accordance with the method and apparatus shown in British Patent Application publication No. 2,240,295.

A method of carrying out the invention will now be described by way of example only with reference to the accompanying drawings, wherein.

Figure 1:
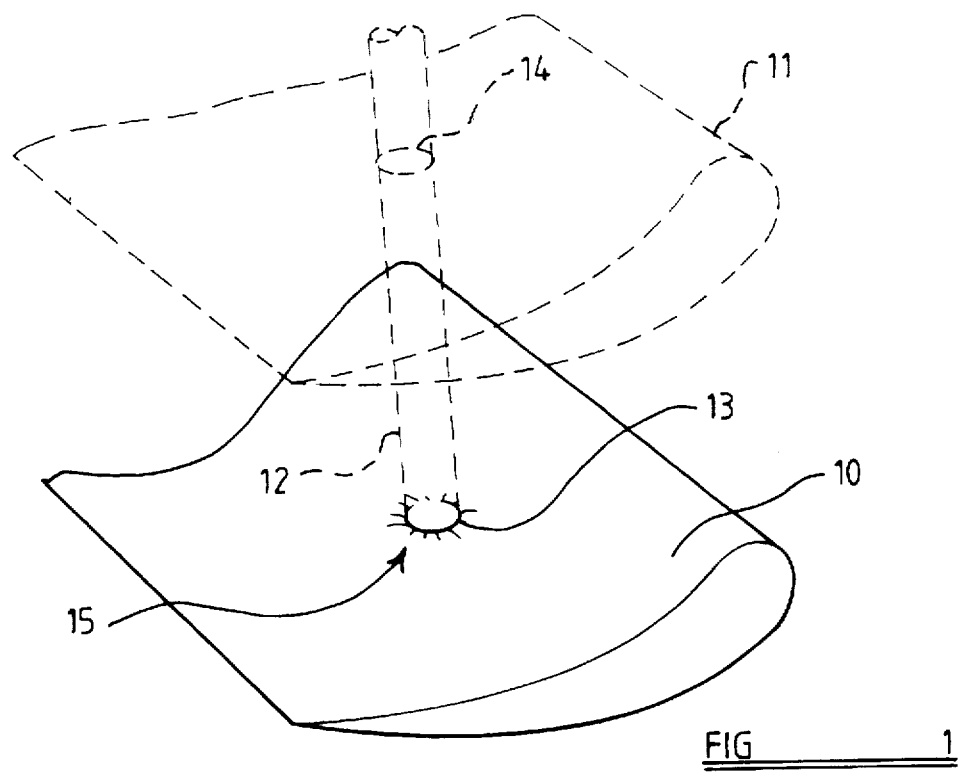
FIG. 1 illustrates part of a turbine blade having damage around a lacing wire hole.

Referring first to FIG. 1, a turbine blade is shown at 10 which will be one of a large number of turbine blades in an array and secured to a rotor, an adjacent blade is shown at 11 in dotted outline and the blades, or at least groups of blades are often connected by means of a lacing wire shown at 12.

The lacing wire passes through a lacing wire hole 13 in blade 10 and will pass through similar lacing wire holes such as that shown at 14 on the blade 1.

The lacing wire 12 may be a wire, a rod or tubular member, its purpose being to dampen vibration of the blades and/or minimise relative movement between adjacent blades and in some cases may merely pass through holes, such as those shown at 13 and 14 in the blades 12 and 11 or alternatively nay be secured thereto by brazing, for example.

After some use of the turbine damage in the area of the lacing wire holes 13 and 14 is not uncommon, this is an area of high stress and the likelihood of damage can be accentuated by inaccurate forming of the lacing wire holes which can lead to gaps between the lacing wire and the surface of the turbine blade attracting contaminants. Furthermore, slight inaccuracies can also accentuate movement between the lacing wire 12 and the blades which can cause local hardening around the surface of the blade defining the lacing wire hole and cracks may begin to appear, shown diagrammatically at 15 in FIG. 1.

It may be that whereas cracks may appear around one lacing wire hole but not around many of the holes in the blades of the array, the fact that damage is apparent on a single blade may indicate that it is likely to occur on other blades in the array even though there is no visible sign of such damage. Nonetheless, the hardening of the surface of the blade around a lacing wire hole, plus the trapping of contaminants in that area can lead to premature failure and damage due to stress corrosion cracking.

Figure 2:
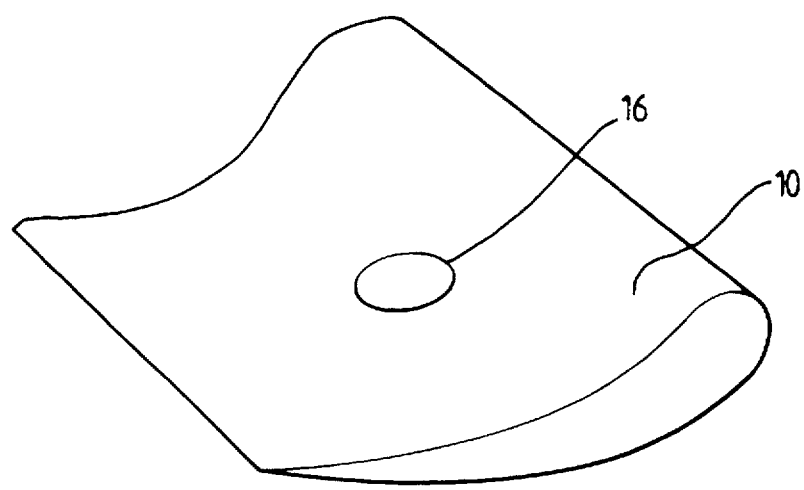
FIG. 2 illustrates the blade of FIG. 1 with the damaged material removed.

In order to carry out the repair process, after removal of the lacing wire the lacing wire hole 13 is enlarged to the form shown at 16 in FIG. 2, the amount of material being removed depending upon the damage or at least the extent of the material of the blade that is thought to be suspect.

The material of the blade may be removed by any convenient means and can be removed by machining or possibly by grinding and with hand tools or even by an etching process.

In some instances the blade 10 may be removed from the rotor and in other instances in order to carry out a speedy repair, it may remain on the rotor in which case access to the work site is more difficult.

Figure 3:
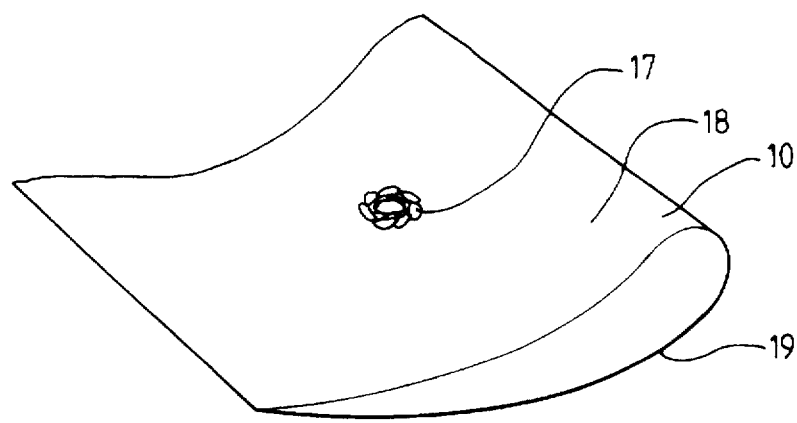
FIG. 3 illustrates the blade of FIG. 1 with the enlarged hole partly filled with weld metal.

After the lacing wire hole 13 has been enlarged to the form shown at 16 in FIG. 2, material 17 compatible with the blade itself but possibly including other metals alloyed in a manner to provide a durable but long lasting surface is welded to the blade as shown in FIG. 3. It is envisaged that welding of new metal 17 may take place on either side of the blade or possibly both.

Not only is all the metal that has been removed replaced during the welding process but additional metal 17 is also put in place so that the resulting hole after welding is considerably smaller than the hole 13.

Figure 4:
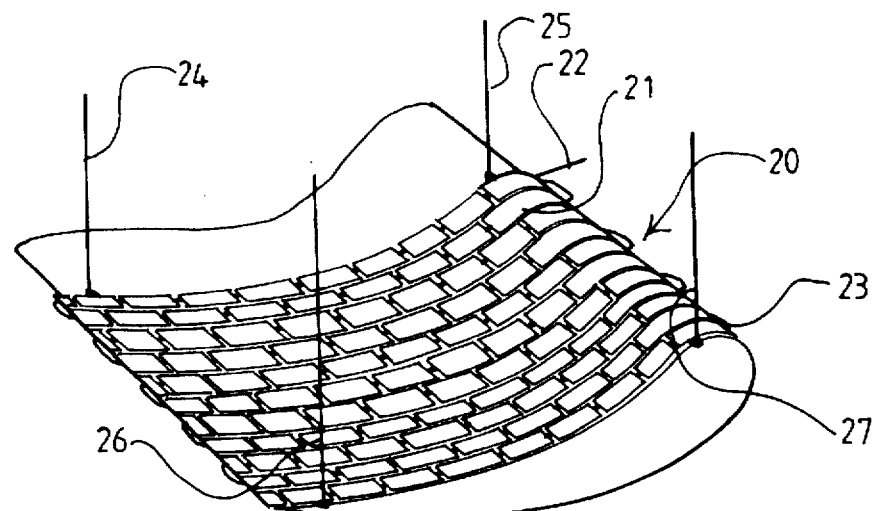
FIG. 4 illustrates part of the blade being subjected to a heat treatment process.
Figure 5:
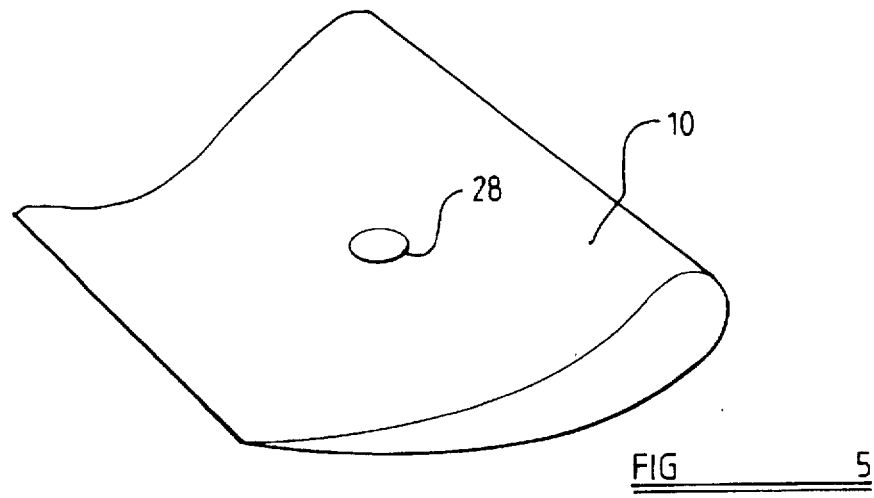
FIG. 5 illustrates the blade with the lacing wire hole re-formed.

The new metal 17 may be ground or polished so that the concave surface 18 and convex surface 19 of the blade 10 are returned to their original form and then a heat treatment process may be carried out at shown in FIG. 4 in which the area of the blade surrounding the lacing wire hole is heated to a predetermined temperature for predetermined lengths of time.

FIG. 4 shows a heating mat generally indicated at 20 comprising a plurality of ceramic beads 21 through which heating elements pass and a controlled current is passed through the heating mat 20 from inlet 22 to outlet 23.

In order to ensure that the blade is heated to the required temperatures, the temperature of the blade during the heating process may be carefully monitored by means of thermocouples shown at 24, 25, 26 and 27. The thermocouples may be placed at other parts of the blade to ensure that those parts of the blade are not adversely affected during the welding to provide weld metal 17 or during the heat treatment processes as shown in FIG. 4.

The temperature to which the blade is heated and the length of time for which it is heated and held at different temperatures will be dependent upon the extent of heating carried out to replace the weld metal 17 and also the nature of the blade itself.

It is envisaged that after the welding 17 has taken place that part of the blade may be X-rayed and have other tests, e.g. hardness tests carried out thereto to ascertain the most desirable heat treatment process to properly stress relieve the blade.

After the required heat treatment process has been carried out the new lacing wire hole 28 is formed in the blade 10 by a machining operation and the diameter of the new lacing wire hole 28 may be identical to the original hole 13, it may be smaller or larger depending upon the nature of the lacing wire which is intended to be inserted through the hole 28.

Figure 6:
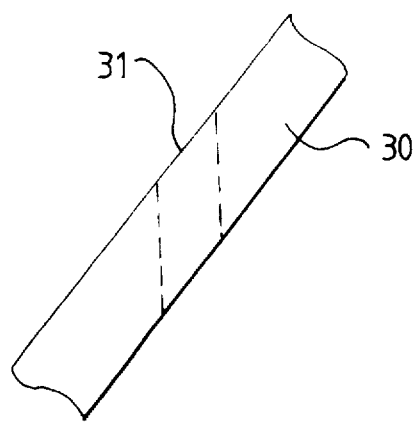
FIG. 6 illustrates part of a blade prior to welding of the lacing wire hole.
Figure 7:
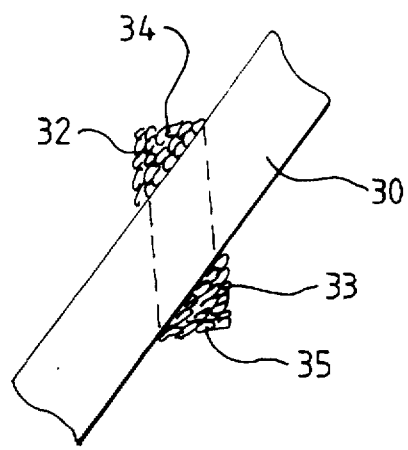
FIG. 7 illustrates the blade shown in FIG. 6 after welding.

Referring now to FIGS. 6 and 7, FIG. 6 shows a turbine blade 30 having a lacing wire hole 31. The lacing wire hole 31 is filled with weld material either completely or partially and excess weld material 32 and 33 is applied to the blade 30 so that when it is required to reform the lacing wire hole 31 the machine bit, for example a drill, can approach a surface 34 that is substantially normal to the direction of travel of the drill during the reforming of the lacing wire hole.

Similarly, the surface 35 from which the drill will exit the turbine blade 30 is also substantially normal ensuring that there is no uneven forces applied to the drill during reforming of the lacing wire hole 31.

Figure 8:
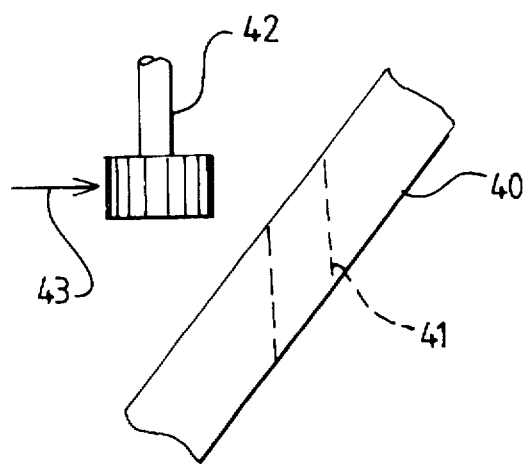
FIG. 8 illustrates a further turbine blade.
Figure 9:
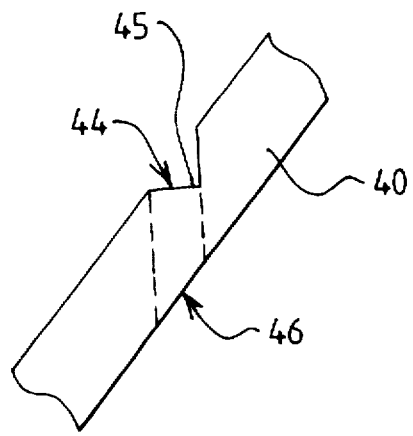
FIG. 9 illustrates the blade shown in FIG. 8 after a flat has been machined.

An alternative method is shown in FIGS. 8 and 9. A turbine blade 40 in which it is desired to have a lacing wire hole 41 is approached by a machine bit, for example a milling cutter 42 in a direction as shown by arrow 43. A flat 44 is milled into the surface of the turbine blade 40 thus leaving a substantially normal surface 45 which may be approached by a lacing wire hole forming tool such as a drill.

If desired, to ensure that the drill connects with the turbine blade 40 without any uneven forces being applied thereto, a further flat may be formed in a manner as described above in the region 46.

Whilst the above description relates specifically to a lacing wire hole in a turbine blade, it is equally applicable to any other discontinuity, for example apertures provided in the end of the blade which are intended to engage with projections provided on cover bands or other seals provided at the end of the turbine blade. Such apertures also are subjected to similar kinds of damage as have been described herein.

The features disclosed in the foregoing description, or the accompanying drawings, expressed in their specific forms or in the terms or means for performing the desired function, or a method or process for attaining the disclosed result, may, separately or in any combination of such features, be utilised for realising the invention in diverse forms thereof.

I claim:

1. A method of repairing a turbine blade, comprising:

(a) removing material around a lacing wire hole in the blade;

(b) replacing the removed material with new metal by welding;

(c) adding new metal by welding so as to form an entry surface for a drill or machine bit for reforming the lacing wire hole, and which entry surface is substantially normal to a longitudinal axis of the hole;

(d) carrying out a heat treatment process on the new metal and a surrounding area of the blade, and (e) reforming the lacing wire hole with said drill or machine bit.

2. A method according to claim 1, comprising a further step of adding, by welding, new metal so as to form an exit surface for said drill or machine bit for reforming the lacing wire hole and which exit surface is substantially normal to a longitudinal axis of the hole.

3. A method of repairing a turbine blade as claimed in claim 1, further comprising testing for hardness the repaired area around the lacing wire hole after material is added by welding and prior to said heat treatment process, analyzing the information concerning hardness of the repaired area material, and, based on such analysis, determining the heat treatment process conditions necessary to achieve a desired degree of hardness in the heat treated blade.

4. A method of repair as claimed in claim 1, further comprising, prior to the reforming of the lacing wire hole, machining a flat on one side of the turbine blade, reforming the lacing wire hole by a drill or machine bit, the drill or machine bit entering the turbine blade in the region of said flat.

5. A method of repair as claimed in claim 4, further comprising forming two flats on opposite sides of the turbine blade, both in the region of said lacing wire hole or the region where the lacing wire hole is to be reformed, the arrangement being such that the drill or machine bit both enters and leaves the turbine blade while reforming the lacing wire hole through a surface and from a surface substantially normal to a direction of travel of the drill or machine bit.

6. A method of repairing a turbine blade as claimed in claim 1, further comprising removing, by a machining operation, material surrounding said lacing wire hole which has to be removed.

7. A method of repair as claimed in claim 1, further comprising removing, by chemical etching, material to be removed around said lacing wire hole.

8. A method of repairing a turbine blade as claimed in claim 1, further comprising X-raying the area of said repair after said repair process has been carried out.

9. A turbine blade repaired in accordance with the method of claim 1, wherein a longitudinal axis of the reformed lacing wire hole is essentially coextensive with a longitudinal centerline of the drill or machine bit and substantially free of wandering from said centerline due to the entry of the drill or machine bit into the replaced weld material in the lacing wire hole at an angle normal to a horizontal plane extending through the drill or machine bit entry surface.

10. A turbine blade repaired in accordance with the method of claim 2, wherein a longitudinal axis of the reformed lacing wire hole is essentially coextensive with a longitudinal centerline of the drill or machine bit and substantially free of wandering from said centerline due to the entry of the drill or machine bit into the replaced weld material in the lacing wire hole at an angle normal to a horizontal plane extending through the drill or machine bit entry and exit surfaces.

* * * * *